United States Patent
Li et al.

(10) Patent No.: US 6,791,775 B2
(45) Date of Patent: Sep. 14, 2004

(54) METHOD AND APPARATUS TO DISTINGUISH EFFECTS OF ADJACENT TRACK ENCROACHMENT FROM HEAD THERMAL MOVEMENT

(75) Inventors: Zhaohui Li, Santa Clara, CA (US); Geng Wang, San Jose, CA (US); Keung Youn Cho, San Jose, CA (US)

(73) Assignee: Samsung Electronics, Co., Inc. (KR)

( * ) Notice: Subject to any disclaimer, the term of this patent is extended or adjusted under 35 U.S.C. 154(b) by 230 days.

(21) Appl. No.: 09/981,464

(22) Filed: Oct. 15, 2001

(65) Prior Publication Data

US 2003/0072097 A1 Apr. 17, 2003

(51) Int. Cl.⁷ .............................................. G11B 27/36
(52) U.S. Cl. .............................. 360/31; 360/53; 360/66
(58) Field of Search ............................ 360/31, 51, 53, 360/75, 78.15, 66

(56) References Cited

U.S. PATENT DOCUMENTS

| | | |
|---|---|---|
| 4,958,337 A | 9/1990 | Yamanaka et al. |
| 5,442,638 A | 8/1995 | Awad et al. |
| 5,610,776 A | 3/1997 | Oh |
| 5,754,353 A | 5/1998 | Behrens et al. |
| 5,760,982 A | 6/1998 | Stein |
| 5,822,139 A | 10/1998 | Ayabe |
| 5,844,911 A | 12/1998 | Schadegg et al. |
| 5,914,594 A | 6/1999 | Mian |
| 6,151,180 A | 11/2000 | Bang |
| 6,226,142 B1 * | 5/2001 | Drouin et al. ............ 360/77.08 |
| 6,313,964 B1 * | 11/2001 | Lamberts et al. .............. 360/75 |
| 6,466,387 B1 * | 10/2002 | Ogasawara et al. ............ 360/48 |
| 6,608,731 B2 * | 8/2003 | Szita ............................ 360/75 |
| 2002/0030912 A1 * | 3/2002 | Kasajima et al. .............. 360/31 |

FOREIGN PATENT DOCUMENTS

| | | |
|---|---|---|
| EP | 0 426 353 A2 | 5/1991 |
| EP | 0 463 752 A2 | 1/1992 |
| EP | 0 491 563 A2 | 6/1992 |
| EP | 0 582 464 A2 | 2/1994 |
| EP | 0 801 387 A2 | 10/1997 |
| GB | 2 326 755 A | 12/1998 |
| WO | WO 93/10494 | 5/1993 |

* cited by examiner

*Primary Examiner*—David Hudspeth
*Assistant Examiner*—Glenda P Rodriguez
(74) *Attorney, Agent, or Firm*—Irell & Manella LLP; Jeffrey P. Aiello

(57) ABSTRACT

The present invention is a method and system to determine a quality of a head in a hard disk drive. The method comprises providing a disk having a at least one side with a plurality of tracks, writing on a predetermined track on the plurality of tracks and reading a profile of the predetermined track to provide a first profile value. The head is then moved to an adjacent track where it writes on the adjacent track. A profile of the predetermined track is then read to provide a second profile value. A quality of the head can then be determined based on the first and second values.

20 Claims, 4 Drawing Sheets

METHOD AND APPARATUS TO DISTINGUISH EFFECTS OF ADJACENT TRACK ENCROACHMENT FROM HEAD THERMAL MOVEMENT

BACKGROUND OF THE INVENTION

1. Field of the Invention

The present invention relates in general to disk storage systems and more particularly, to methods and apparatus for distinguishing the effects of adjacent track encroachment from head thermal movement.

2. Description of the Related Art

Disk drives are magnetic recording devices used for the storage of information. The information is typically recorded on concentric tracks on either surface of one or more magnetic recording disks. The disks are rotatably mounted to a spin motor and information is accessed by means of read/write heads that are mounted to actuator arms which are rotated by a voice coil motor. The voice coil motor is excited with a current to rotate the actuator and move the heads. The read/write heads must be accurately aligned with the storage tracks on the disk to ensure proper reading and writing of information. The read/write heads read recorded information from the surface of the disk by sensing the magnetic transitions emanating from the surface of the disk. To write on a data track, current is applied to the read head. The current generates a magnetic field, which magnetizes the surface of the disk.

Recording density may be increased by reducing the width of recording tracks. However, as recording tracks become narrower in physical dimensions, the amount of write current applied to the head may result in erasing data located on adjacent tracks. This is of concern when the write current that is applied is too high. Such a characteristic of the head is known as adjacent track encroachment (ATE). The increase in temperature resulting from the write current may also cause the slider on which the head is mounted to move off the centerline of the track. When the slider cools down, the head may move in the opposite direction. Such movement may be as much as 5 micro-inches for certain heads. Such an effect is typically referred to as head thermal movement. The effects of head thermal movement is typically similar to that of ATE. As a result, it is difficult to distinguish between the effects of ATE and head thermal movement. However, ATE results from an intrinsic property of the head, while head thermal movement is a system characteristic. It desirable to be able to distinguish the effects of these two factors, so as to be able to determine the quality of a head and system performance.

BRIEF SUMMARY OF THE INVENTION

The present invention is a method and system to determine a quality of a head in a hard disk drive. The method comprises providing a disk having a at least one side with a plurality of tracks, writing on a predetermined track on the plurality of tracks and reading a profile of the predetermined track to provide a first profile value. The head is then moved to an adjacent track where it writes on the adjacent track. A profile of the predetermined track is then read to provide a second profile value. A quality of the head can then be determined based on the first and second values.

DETAILED DESCRIPTION OF THE INVENTION

The present invention is an apparatus and methods for distinguishing the effects of adjacent track encroachment from head thermal movement.

Figure 1:
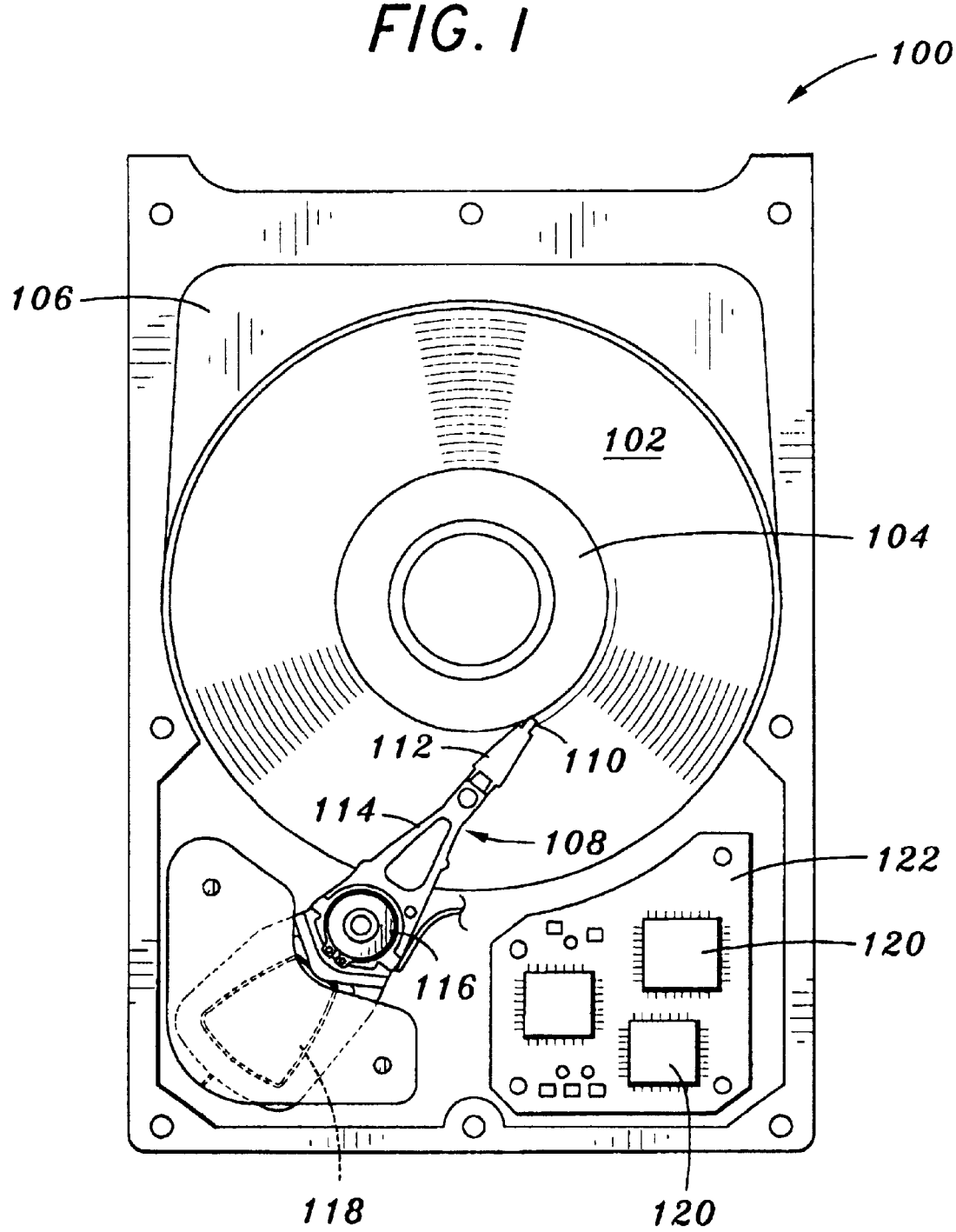
FIG. 1 illustrates a hard disk drive which utilizes the methods of the invention.

Referring to the drawings more particularly by reference numbers, FIG. 1 shows a hard disk drive 100. The disk drive 100 includes a disk 102 that is rotated by a spin motor 104. The spin motor 104 is mounted to a base plate 106. Also mounted to the base plate 106 is an actuator arm assembly 108. The actuator arm assembly 108 includes a number of heads 110 mounted to corresponding flexure arms 112. The flexure arms 112 are attached to an actuator arm 114 that can rotate about a bearing assembly 116. The assembly 108 also contains a voice coil 118 that is coupled to the magnets 119 that are mounted to the base plate 106. Energizing the voice coil 118 moves the heads 110 relative to the disk 102. There is typically a single head for each disk surface. The spin motor 104, voice coil 118 and the heads 110 are coupled to a number of electronic circuits 120 mounted to a printed circuit board 122. In the following discussion, only one head 110 is referenced. The electronic circuits 120 typically include a read channel circuit, a microprocessor-based controller and a random access memory (RAM) device.

Figure 2:
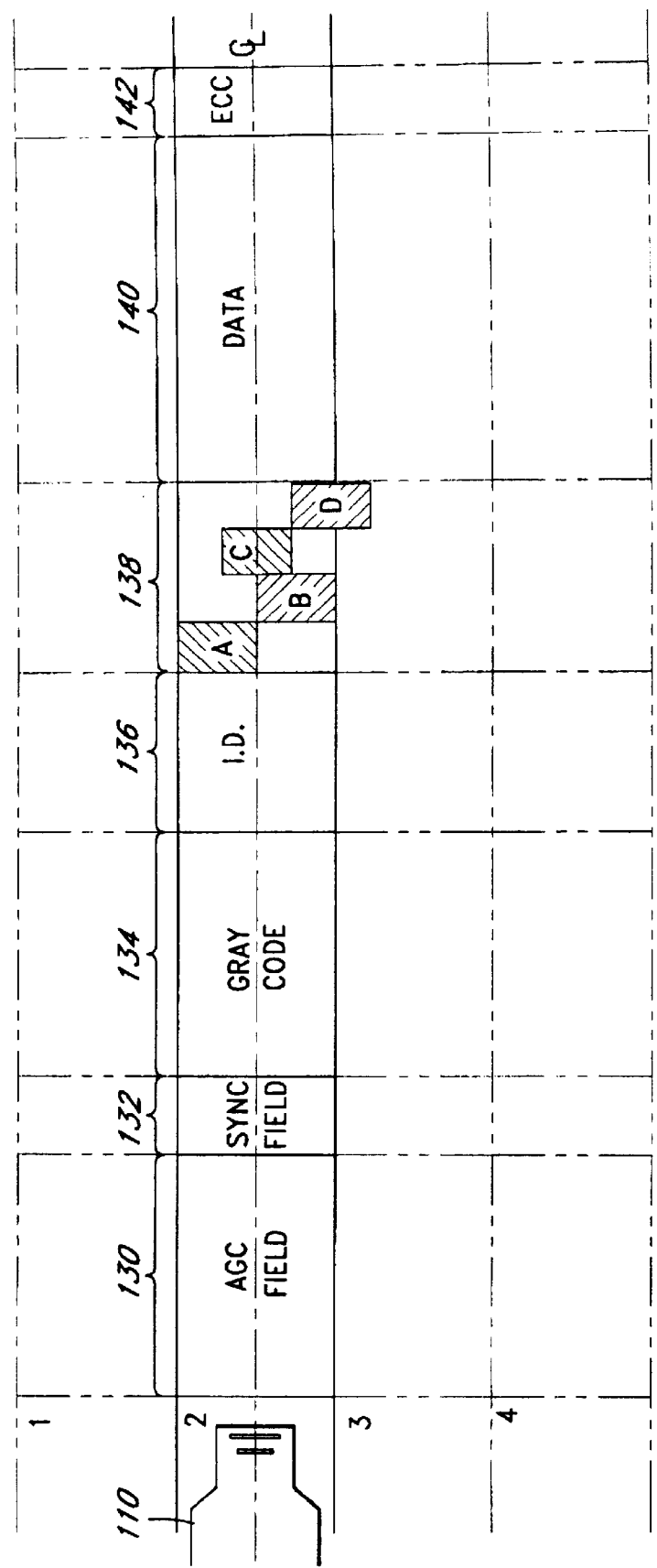
FIG. 2 illustrates the general layout of the servo field region of a track.

As shown in FIG. 2, data is typically stored within sectors of radially concentric tracks located across the disk 102. A typical sector will have an automatic gain control (AGC) field 130, a synchronization (sync) field 132, a gray code field 134 that identifies the track, an identification (ID) field 136 that defines the sector, a servo field 138 which includes a number of servo bits A, B, C, D, a data field 140 which contains the data and an error correction code field 142. In operation, the head 110 is moved to a track and the servo information provided in servo field 138 is read and provided to the electronic circuits 120. The electronic circuits 120 utilize the variation in the servo bits (A–B) or (C–D) to generate Q, a positioning signal for aligning the head 110.

Figure 3:
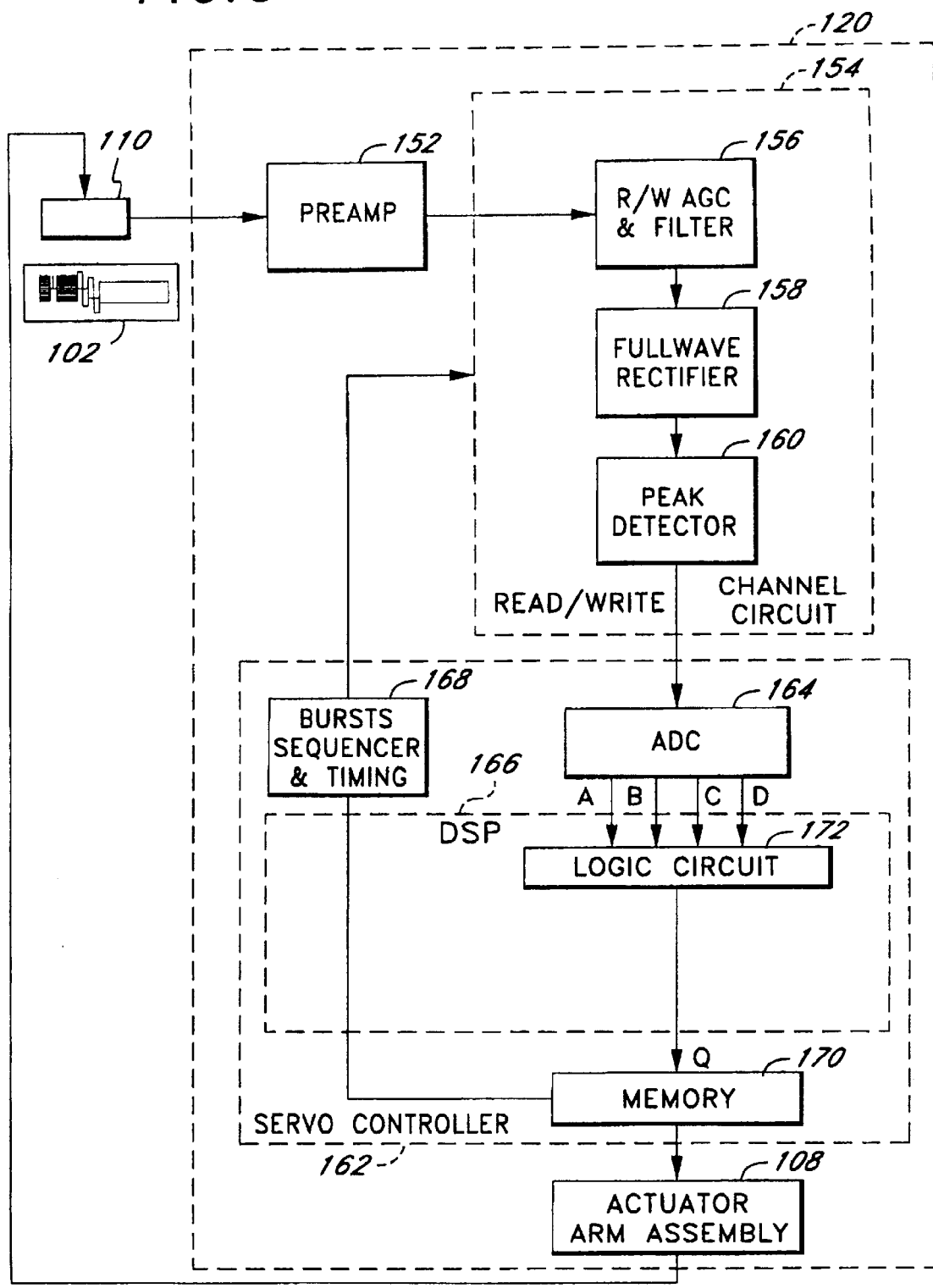
FIG. 3 is a block diagram of portions of an integrated circuit read channel in accordance with the present invention.

FIG. 3 is a block diagram of an electronic circuit 120 of the drive. The electronic circuit 120 includes a preamplifier 152 which is coupled to a read/write (R/W) channel circuit 154. The R/W channel circuit 154 includes a R/W Automatic Gain Control (AGC), a filter circuit 156, a fullwave rectifier 158 and a peak detector 160. The electronic circuit 120 further comprises a microprocessor-based servo controller 162 which includes an analog-to-digital converter (ADC) 164, a digital signal processor (DSP) 166, a burst sequencer and timing circuit 168 and a memory 170, such as a random access memory (RAM) device. The DSP 166 includes a logic circuit 172.

The electronic circuit 120 is coupled to one of the magnetic heads 110 which senses the magnetic field of a magnetic disk 102. When reading the servo information located in the servo field region 10 on the disk 102, the head 110 generates a read signal that corresponds to the magnetic field of the disk 102. The read signal is first amplified by the preamplifier 152, and then provided to the R/W channel circuit 154. The AGC data included in the read signal is provided to the R/W AGC and filter circuit 156. The R/W AGC circuit in circuit 156 monitors the AGC data provided by the read signal and the read signal is then filtered by the filter circuit located in the R/W AGC and filter circuit 156. The fullwave rectifier 158 rectifies the read signal and provides the rectified read signal to the peak detector 160. The peak detector 160 detects the amplitude of the read signal. The read signal is then provided to the ADC 164 which provides digitized samples of the analog read signal. The digitized signal is then provided to a logic circuit 172 located within the DSP 166. The logic circuit 172 generates a position signal Q, based on the servo bits A, B, C and D that are read by the head 110. The position signal Q may be stored in memory and used to control the position of the actuator arm assembly 108.

In accordance with the present invention, the DSP 166 may direct the magnetic heads 110 to erase a selected band or group of tracks. In one embodiment, the band is erased using medium (e.g., 130 MHz) or low frequency (30–40 MHz). The frequency to be applied depends on the density of information on the disk. If the density of the disk is 20 Gbits per square inch, a frequency of 130 MHz may be applied. In one embodiment, the DSP 166 sets the write gate (or circuitry controlling writing of information by the write element of the read/write head 110) to write over a predetermined portion a track (or group of tracks) when the read/write head 110 is instructed to write. The DSP 166 also sets the read gate (or circuitry controlling reading of information by the read sensor in the read/write head 110) to read data within limits (i.e., X%) set by the write gate. In other words, the read sensor is programmed to read the portions of the track which have been written to. In one embodiment, X is 25%. The DSP 166 then instructs the read/write head 110 to write on a selected track. Such as track N. The profile of the track is then read to provide a read signal. Based on the track profile, the peak amplitude of the read signal TAA0 is obtained. The read/write head 110 is then instructed to move to an adjacent track, such as track (N−1) or (N+1), and is instructed to write a predetermined number of times Y, over the portion of the track, e.g., X% of the track previously specified to the write gate. This writing process (writing Y times over the adjacent track) may be interspersed with periods of delay or non-writing intervals. Upon completion of the writing process, the track profile of the track N is read again, to obtain the peak amplitude TAA1 of the read signal. The ATE value may be determined based on TAA0 and TAA1. The ATE value may then be stored along with information regarding the corresponding read/write head. This information may be used to determine the quality of the read/write head due to effects of ATE.

Figure 4:
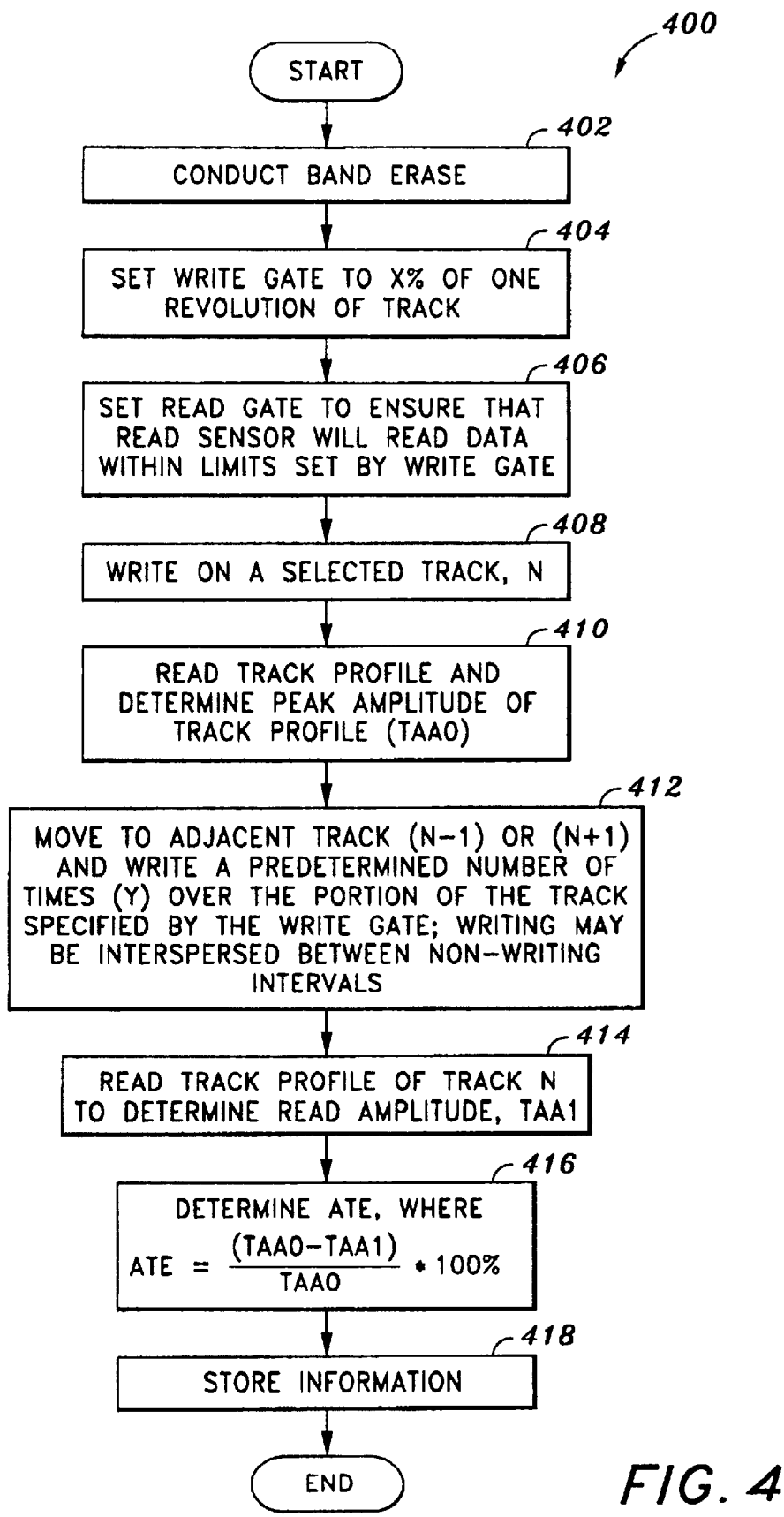
FIG. 4 is a flow chart illustrating one embodiment of a process for distinguishing the effects of adjacent track encroachment from head thermal movement.

FIG. 4 is a flow chart that illustrates one embodiment of the quality identification process provided in accordance with the principles of the invention. Proceeding from a start state, the process 400 proceeds to conduct a band erase, as shown in process block 402. In one embodiment, the band erase may be performed for a band comprising a predetermined number of tracks. Next, the process 400 sets the write gate within the logic circuit 172 to X% of one revolution of a track (process block 404). In other words, the write head will be instructed to write over X% of a selected track or number of tracks. The process 400 also sets the read gate within the logic circuit 172 to ensure that the read head will read data within the limits set by the write gate (process block 406). Once the read and write gates have been initialized, the process 400 advances to process block 408, where it writes on a selected track, N. When writing has been completed, the process 40 reads the data written on the track so as to obtain the profile of the read signal, also known as the track profile (process block 410). From the track profile, the process 400 determines the peak amplitude TAA0 of the track profile.

The process 400 then proceeds to process block 412, where the read/write head is moved to an adjacent track, such as (N−1) or (N+1). Data is then written on the track (N−1) or (N+1) a predetermined number of times Y, over the portion of the track (e.g., X% of the track) specified by the write gate. Writing of the data may be interspersed between non-writing or rest intervals. This facilitates cooling of the read/write head. Once this has been completed, the process 400 moves back to track N to determine the peak amplitude TAA1 of the track profile after data has been written to the adjacent track (N−1) or (N+1), as shown in process block 414.

Once TAA1 has been determined, the ATE value may be determined (process block 416). In one embodiment, the ATE value may be determined from the following expression:

$$ATE\ \text{value}=[(TAA0-TAA1)/TAA0]*100\%$$

Thus, if TAA1 is equal to TAA0, it means that there is no change in the read signal after writing on an adjacent track has been performed. As a result, the ATE value will be zero. Otherwise, if the ATE value is non-zero, it means that writing on the adjacent track (N−1) or (N+1) has affected the track profile on track N. In this manner, the effects of ATE may be determined.

Once the ATE value has been calculated, it may be stored along with information regarding the corresponding read/write head (process block 418). The process 400 then terminates.

Through the implementation of the technique of the present invention, the effects of ATE and head thermal movement may be distinguished. Once the value of ATE is determined, the quality of a read/write head may also be determined.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed:

1. A method for determining a quality of a head in a hard disk drive, comprising:
   providing a disk having a at least one side with a plurality of tracks;
   writing on a predetermined track on said plurality of tracks;
   reading a profile of said predetermined track to provide a first profile value;
   moving to a track adjacent to said predetermined track;
   writing on said adjacent track;
   reading a profile of said predetermined track to provide a second profile value; and
   determining an adjacent track encroachment quality value of said head based on said first and second profile values.

2. The method as recited in claim 1, further comprising erasing a predetermined plurality of tracks prior to acts b) and e).

3. The method as recited in claim 1, wherein writing on said predetermined track and said adjacent track comprises writing over a predetermined portion of said tracks.

4. The method as recited in claim 3, wherein writing on said predetermined track and said adjacent track comprises writing a predetermined number of times on said predetermined track and said adjacent track.

5. The method as recited in claim 4, wherein reading said profile of said predetermined track to provide a first profile value comprises reading said profile said predetermined number of times to provide said first profile value, and wherein reading said profile of said profile to provide a second profile value comprises reading said profile said predetermined number of times to provide said second profile value.

6. The method as recited in claim 5, wherein reading said profile of said predetermined track to provide a first profile value comprises reading said profile to obtain a first peak value of said profile and to provide said first profile value based on said first peak value, and wherein reading said profile to provide said second profile value comprises reading said profile of said obtain a second peak value of said profile and to provide said second profile value based on said second peak value.

7. The method as recited in claim 6, wherein said adjacent track encroachment quality value of said head is based on a difference between said first and said second peak values.

8. The method as recited in claim 7, wherein said adjacent track encroachment quality value is expressed as a percentage of said difference between said first and second peak values, divided by said first peak value.

9. The method as recited in claim 8, further comprising storing said adjacent track encroachment quality value in memory.

10. The method as recited in claim 4, wherein writing on said predetermined and said adjacent tracks comprises writing a predetermined number of times on said predetermined track and said adjacent track, said writing process being interspersed with non-writing intervals.

11. A system to determine a quality of a head in a hard disk drive, comprising:

a housing;

a spin motor mounted to said housing;

an actuator arm mounted to said spin motor;

a disk attached to said spin motor, said disk having at least one side with a plurality of tracks;

a memory to store instruction sequences;

a processor coupled to said memory;

a read/write head mounted to said actuator arm to write on and read from said at least one side of said disk, said read/write head coupled to said processor, wherein said processor executes said instruction sequences to writing on a predetermined track on said plurality of tracks;

reading a profile of said predetermined track to provide a first profile value;

moving to a track adjacent to said predetermined track;

writing on said adjacent track;

reading a profile of said predetermined track to provide a second profile value; and determining an adjacent track encroachment quality value of said head based on said first and second profile values.

12. The system as recited in claim 11, wherein said instruction sequences further cause said processor to erase a predetermined plurality of tracks.

13. The system as recited in claim 11, wherein writing on said predetermined track and said adjacent track comprises writing over a predetermined portion of said tracks.

14. The system as recited in claim 13, wherein writing on said predetermined track and said adjacent track comprises writing a predetermined number of times on said predetermined track and said adjacent track.

15. The system as recited in claim 14, wherein reading said profile of said predetermined track to provide a first profile value comprises reading said profile said predetermined number of times to provide said first profile value, and wherein reading said profile of said profile to provide a second profile value comprises reading said profile said predetermined number of times to provide said second profile value.

16. The system as recited in claim 15, wherein reading said profile of said predetermined track to provide a first profile value comprises reading said profile to obtain a first peak value of said profile and to provide said first profile value based on said first peak value, and wherein reading said profile to provide said second profile value comprises reading said profile of said obtain a second peak value of said profile and to provide said second profile value based on said second peak value.

17. The system as recited in claim 16, wherein said adjacent track encroachment quality value of said head is based on a difference between said first and said second peak values.

18. The system as recited in claim 17, wherein said adjacent track encroachment quality value is expressed as a percentage of said difference between said first and second peak values, divided by said first peak value.

19. The system as recited in claim 18, wherein said instruction sequences further comprise storing said adjacent track encroachment quality value in memory.

20. The system as recited in claim 14, wherein writing on said predetermined and said adjacent tracks comprises writing a predetermined number of times on said predetermined track and said adjacent track, said writing process being interspersed with non-writing intervals.

* * * * *